United States Patent
Feldpusch et al.

(10) Patent No.: US 12,250,198 B2
(45) Date of Patent: *Mar. 11, 2025

(54) FEDERATED DNS CACHING

(71) Applicant: Level 3 Communications, LLC, Broomfield, CO (US)

(72) Inventors: Michael Feldpusch, Westminster, CO (US); Dan Luther, Claremore, OK (US)

(73) Assignee: Level 3 Communications, LLC, Denver, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 18/540,059

(22) Filed: Dec. 14, 2023

(65) Prior Publication Data

US 2024/0113999 A1  Apr. 4, 2024

Related U.S. Application Data

(63) Continuation of application No. 18/079,040, filed on Dec. 12, 2022, now Pat. No. 11,848,911, which is a continuation of application No. 17/659,578, filed on Apr. 18, 2022, now Pat. No. 11,533,291.

(60) Provisional application No. 63/208,891, filed on Jun. 9, 2021.

(51) Int. Cl.
| | |
|---|---|
| *H04L 67/1021* | (2022.01) |
| *H04L 61/4511* | (2022.01) |
| *H04L 61/5076* | (2022.01) |
| *H04L 61/58* | (2022.01) |

(52) U.S. Cl.
CPC .......... *H04L 61/58* (2022.05); *H04L 61/4511* (2022.05); *H04L 61/5076* (2022.05)

(58) Field of Classification Search
CPC . H04L 61/58; H04L 61/5076; H04L 61/4511; H04L 12/46; H04L 12/741; H04L 29/06; H04L 29/08
USPC .......................................................... 709/245
See application file for complete search history.

(56) References Cited

U.S. PATENT DOCUMENTS

| | | | |
|---|---|---|---|
| 10,033,692 B1 | 7/2018 | Vavrusa | |
| 10,812,442 B1 | 10/2020 | Gray | |
| 11,019,022 B1 | 5/2021 | Thornewell | |
| 11,233,768 B1 | 1/2022 | Flack | |
| 11,444,931 B1 | 9/2022 | Quevedo | |
| 11,533,291 B1* | 12/2022 | Feldpusch | ............... H04L 61/58 |
| 11,848,911 B2* | 12/2023 | Feldpusch | ........... H04L 61/4511 |
| 2002/0078233 A1 | 6/2002 | Biliris et al. | |
| 2010/0005191 A1 | 1/2010 | Drako | |
| 2010/0011420 A1 | 1/2010 | Drako | |
| 2017/0048186 A1 | 2/2017 | Blinn | |
| 2017/0118250 A1 | 4/2017 | Phillips | |
| 2017/0155645 A1* | 6/2017 | Wu | ..................... H04L 61/4511 |
| 2018/0131665 A1 | 5/2018 | Joffe | |
| 2018/0351976 A1 | 12/2018 | Shitrit-Efergan | |
| 2019/0306188 A1 | 10/2019 | Medvedovsky | |
| 2021/0021518 A1 | 1/2021 | Chand | |
| 2021/0021564 A1 | 1/2021 | Chand | |
| 2021/0021565 A1 | 1/2021 | Chand | |

(Continued)

*Primary Examiner* — Jude Jean Gilles

(57) ABSTRACT

Systems and methods are provided for distributing a domain name service (DNS) response cache in a DNS resolving system on a network. The systems and methods described herein may improve response times for client queries and also protect the DNS resolving system from DNS related cyber attacks.

20 Claims, 5 Drawing Sheets

(56) References Cited

U.S. PATENT DOCUMENTS

2021/0075729 A1    3/2021  Fedorov
2023/0106413 A1    4/2023  Feldpusch

\* cited by examiner

FEDERATED DNS CACHING

BACKGROUND

A domain name service (DNS) resolver typically receives a DNS query from a client device. When the DNS query is received, the DNS resolver will determine if information associated with the DNS query is stored within a cache of the DNS resolver. If the information is not stored in the cache of the DNS resolver, the DNS resolver will query an authoritative DNS server for the information.

Cyber-attacks, such as a distributed-denial-of-service (DDOS) attack, often causes performance issues with DNS resolvers. For example, an attacker may send a string of invalid hostnames to be resolved at a DNS resolver. This typically causes the DNS resolver to consistently and/or continuously query the authoritative DNS server for the hostname information. These queries may overburden processing capabilities of the DNS resolver and/or authoritative DNS server which slows down response times for legitimate lookups.

SUMMARY

The present application describes systems and methods for distributing a domain name service (DNS) response cache in a DNS resolving system on a network. The systems and methods described herein improve response times for client queries and also protect the DNS resolving system from DNS related cyber-attacks.

For example, and as will be described in more detail below, a DNS recursive server is communicatively coupled to a number of different DNS resolvers and an authoritative DNS server. The DNS recursive server includes a cache that includes a collection of resolved hostnames. When one of the DNS resolvers receives a DNS query from a client device and cannot resolve the DNS query using information stored in its own cache, the DNS resolver provides the query to the DNS recursive server instead of the authoritative DNS server. The DNS recursive server may subsequently provide the query to the authoritative DNS server only when the DNS recursive server cannot resolve the DNS query using information in its own cache. Thus, instead of each DNS resolver querying the authoritative DNS server, network traffic is reduced and resources are preserved since only the DNS recursive server has access to the authoritative DNS server, while the DNS resolvers do not.

Accordingly, the present application describes a method comprising receiving a DNS query from a client device. Once received, the DNS query is provided to a DNS resolver. The DNS resolver determines whether a hostname associated with the DNS query is stored in a resolver cache of the DNS resolver. Based on determining that the hostname associated with the DNS query is not stored in the resolver cache of the DNS resolver, the DNS query is provided to a DNS recursive server. In an example, the DNS recursive server is associated with the DNS resolver and another DNS resolver and is communicatively coupled to an authoritative DNS server. The DNS resolver determines whether the hostname associated with the DNS query is stored in a recursor cache of the DNS recursive server. Based on determining that the hostname associated with the DNS query is stored in the recursor cache of the DNS recursive server, the hostname associated with the DNS query is provided to the DNS resolver.

Also described is a system comprising a DNS resolver having a resolver cache and a DNS recursive server having a recursor cache. The DNS recursive server is communicatively coupled to the DNS resolver and an authoritative DNS server. In an example, the DNS recursive server is operable to receive a DNS query from the DNS resolver based on the DNS resolver determining that a hostname associated with a received DNS query is not stored in the resolver cache. The DNS recursive server determines whether the hostname associated with the DNS query is stored in a recursor cache of the DNS recursive server. Based on determining that the hostname associated with the DNS query is stored in the recursor cache of the DNS recursive server, the hostname associated with the DNS query is provided to the DNS resolver.

Also described is a system that includes a processor and a memory coupled to the at least one processor. The memory stores instructions that, when executed by the processor, perform operations. The operations include receiving a DNS query from a client device and providing the DNS query to a DNS resolver. The DNS resolver determines whether a hostname associated with the DNS query is stored in a resolver cache of the DNS resolver. Based on determining that the hostname associated with the DNS query is not stored in the resolver cache of the DNS resolver, the DNS query is provided to a DNS recursive server. In an example, the DNS recursive server is associated with the DNS resolver and another DNS resolver. The DNS recursive server is also communicatively coupled to an authoritative DNS server. The DNS resolver determines whether the hostname associated with the DNS query is stored in a recursor cache of the DNS recursive server. Based on determining that the hostname associated with the DNS query is stored in the recursor cache of the DNS recursive server, the hostname associated with the DNS query is provided to the DNS resolver.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following figures.

DETAILED DESCRIPTION

Figure 1:
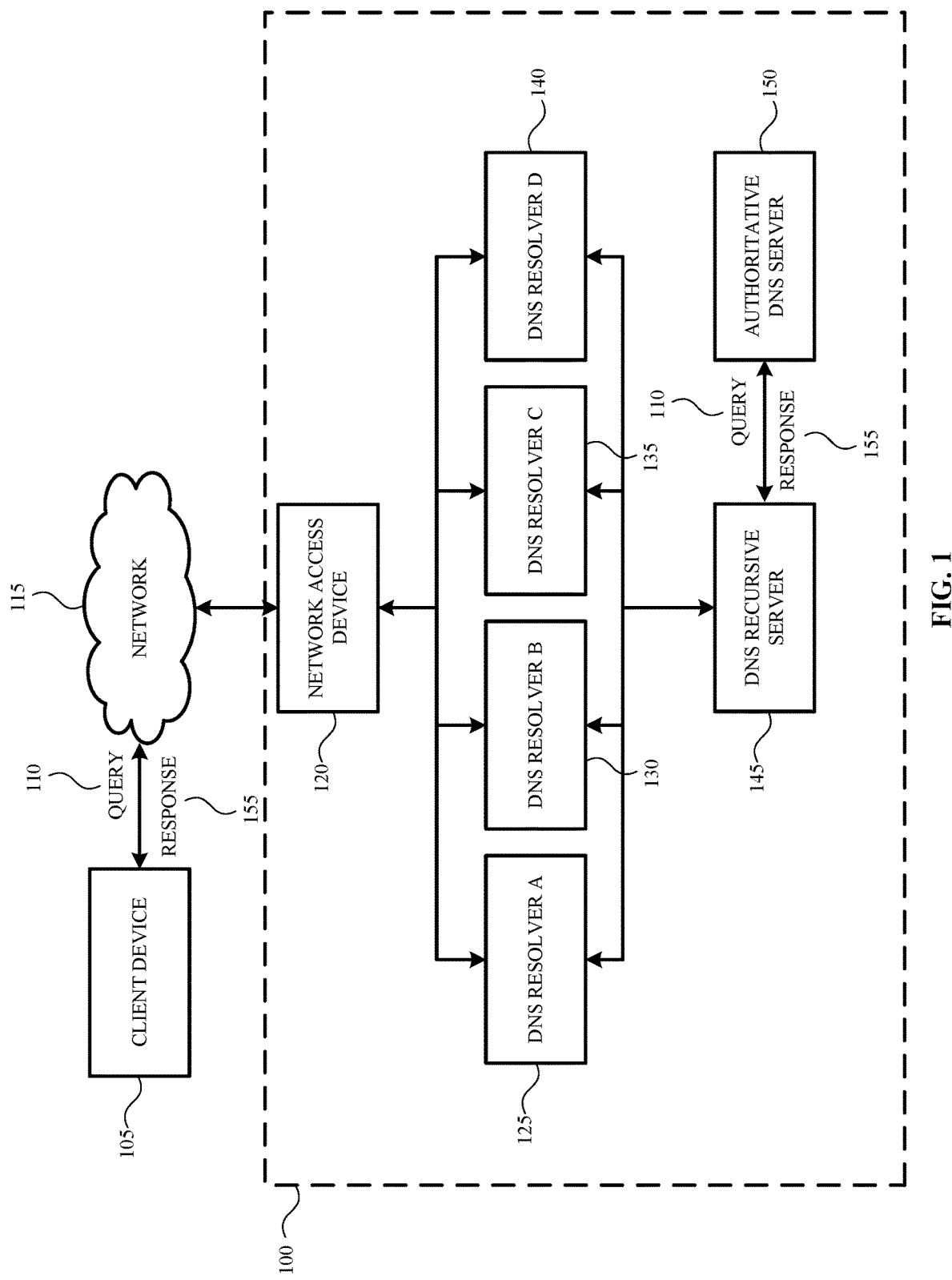
FIG. 1 illustrates an example DNS resolving system having a distributed response cache according to an example

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In a typical DNS recursive lookup system, a DNS resolver receives a query (e.g., a query for a particular webpage) from a client device. When the query is received, the DNS resolver determines whether a hostname associated with the query is stored in its local cache. If not, the DNS resolver queries an upstream root server and/or top level domain server (collectively referred to herein as an authoritative DNS server). The authoritative DNS server determines the internet protocol (IP) address associated with the query and provides the same to the DNS resolver. The DNS resolver may then provide the IP address to the requesting client device.

The DNS resolver may store the IP address in its cache for a period of time known as a time-to-live (TTL). Once the TTL expires, the IP address is typically removed from the cache. However, if the DNS resolver receives the same query (from the same client device or a different client device) once the TTL has expired, the DNS resolver must query the authoritative DNS server a second time. The response time of the received query (e.g., the query received from the client device) decreases (e.g., gets slower) each time the DNS resolver queries the authoritative DNS server. This problem may become exacerbated when multiple DNS resolvers are independently querying the authoritative DNS server at the same time or substantially the same time.

In another example, a DNS resolver and/or an authoritative DNS server be the target of various cyber-attacks. For example, in a distributed-denial-of-service (DDoS) attack, an individual or entity may seek to overwhelm the system by continuously submitting queries that are computationally intense or that otherwise overburden the system. For example, one or more client devices and/or bots may submit queries for various websites that cause various DNS resolvers to continuously query the authoritative DNS server for information. These attacks may also increase the response times of legitimate requests.

Accordingly, the present application describes a system in which a DNS recursive server is communicatively coupled to a number of different DNS resolvers and an authoritative DNS server in a DNS resolving system. In an example, each of the DNS resolvers include their own respective caches. Likewise, the DNS recursive server includes its own cache that includes a collection of resolved hostnames.

In an example, a TTL of each of the entries in the cache of the DNS recursive server is longer than a TTL of the entries in the cache of each of the DNS resolvers. When one of the DNS resolvers receives a DNS query from a client device and cannot resolve the DNS query using information stored in its own cache, the DNS resolver provides the query to the DNS recursive server.

Once the query is received, the DNS recursive server determines whether the DNS query can be resolved using information in its own cache. Because the DNS recursive server stores entries for a longer period of time when compared with the DNS resolvers, the DNS recursive server may act as the upstream query device for each DNS resolver. Thus, traffic to an authoritative DNS server will decrease as the DNS recursive server acts as the liaison between the authoritative DNS server and DNS resolver. Accordingly, the system described herein can respond to received queries more quickly when compared to systems that do not include a DNS recursive server.

For example, when the DNS recursive server determines that it can resolve the DNS query using information stored in its cache, the DNS recursive server provides a response (e.g., an IP address associated with the hostname of the DNS query) to the DNS resolver without forwarding or otherwise providing the query to the authoritative DNS server. For example, the DNS resolver may store the IP address associated with the DNS query in its own cache and subsequently provide the response to requesting client device.

However, if the DNS recursive server determines that it cannot resolve the DNS query using information stored in its cache, the DNS recursive server provides the DNS query to the authoritative DNS server. The authoritative DNS server resolves the DNS query and provides a response (e.g., the IP address associated with the hostname and/or other related information associated with the DNS query) to the DNS recursive server. The DNS recursive server may update its cache with the requested information to prevent subsequent queries to the authoritative DNS server. The DNS recursive server may also provide the response (or information associated with the response) to the DNS resolver.

When the response from the DNS recursive server is received by the DNS resolver, the DNS resolver may store the response (or information associated with the response) in its cache. The DNS resolver may then provide the response (or information associated with the response) to the requesting client device.

Communicatively coupling the DNS recursive server to each of the DNS resolvers and to the authoritative DNS server prevents each of the DNS resolvers from querying the authoritative DNS server. As such, network traffic is reduced, response times are increased (e.g., the system has faster response times) and resources are preserved since only the DNS recursive server has access to the authoritative DNS server. Thus, any authoritative DNS servers that are upstream from a DNS resolver are less likely to become overburdened and/or overwhelmed.

Figure 2A:
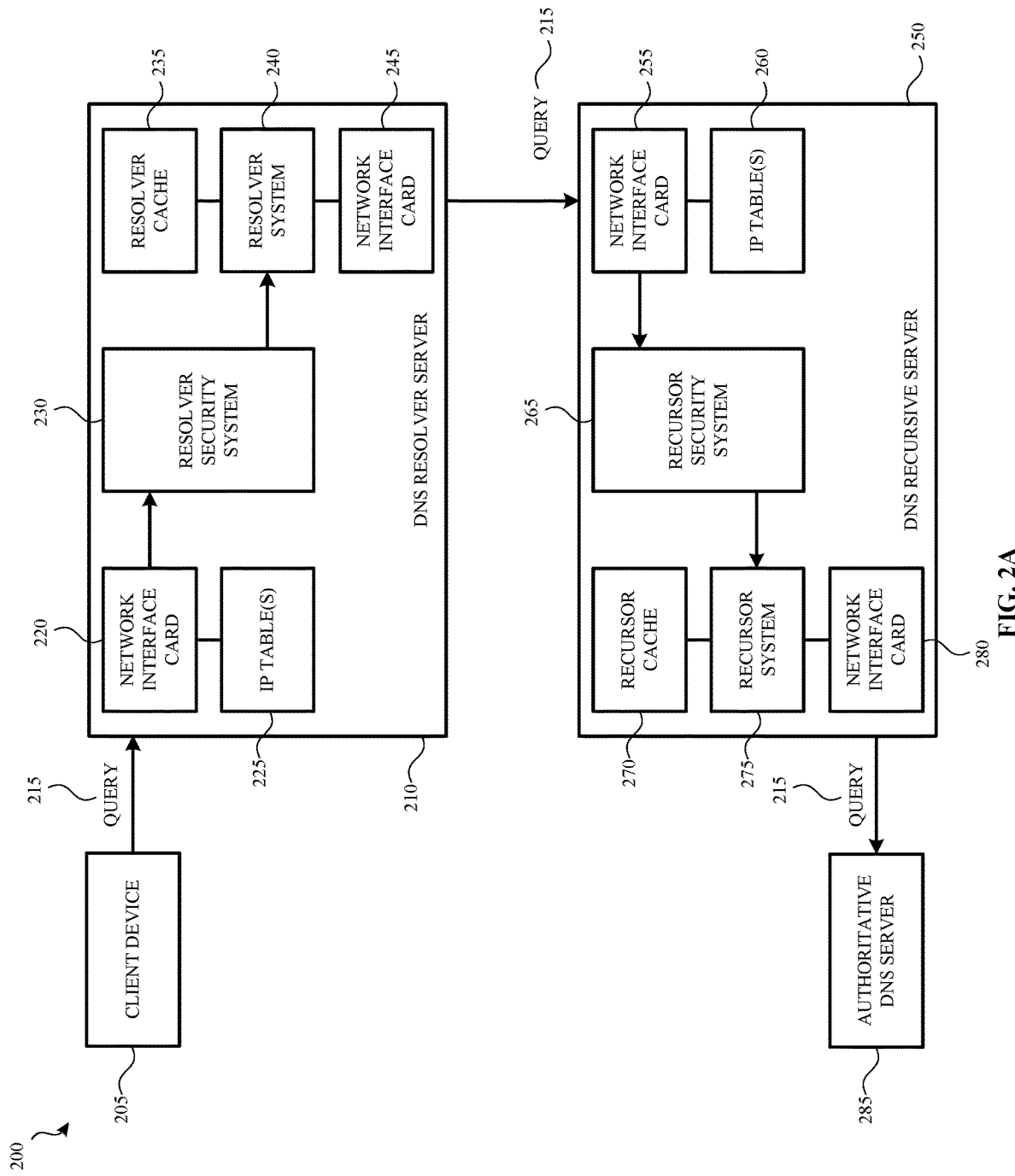
FIG. 2A illustrates another example system for distributing a DNS response cache in a DNS resolving system according to an example.
Figure 2B:
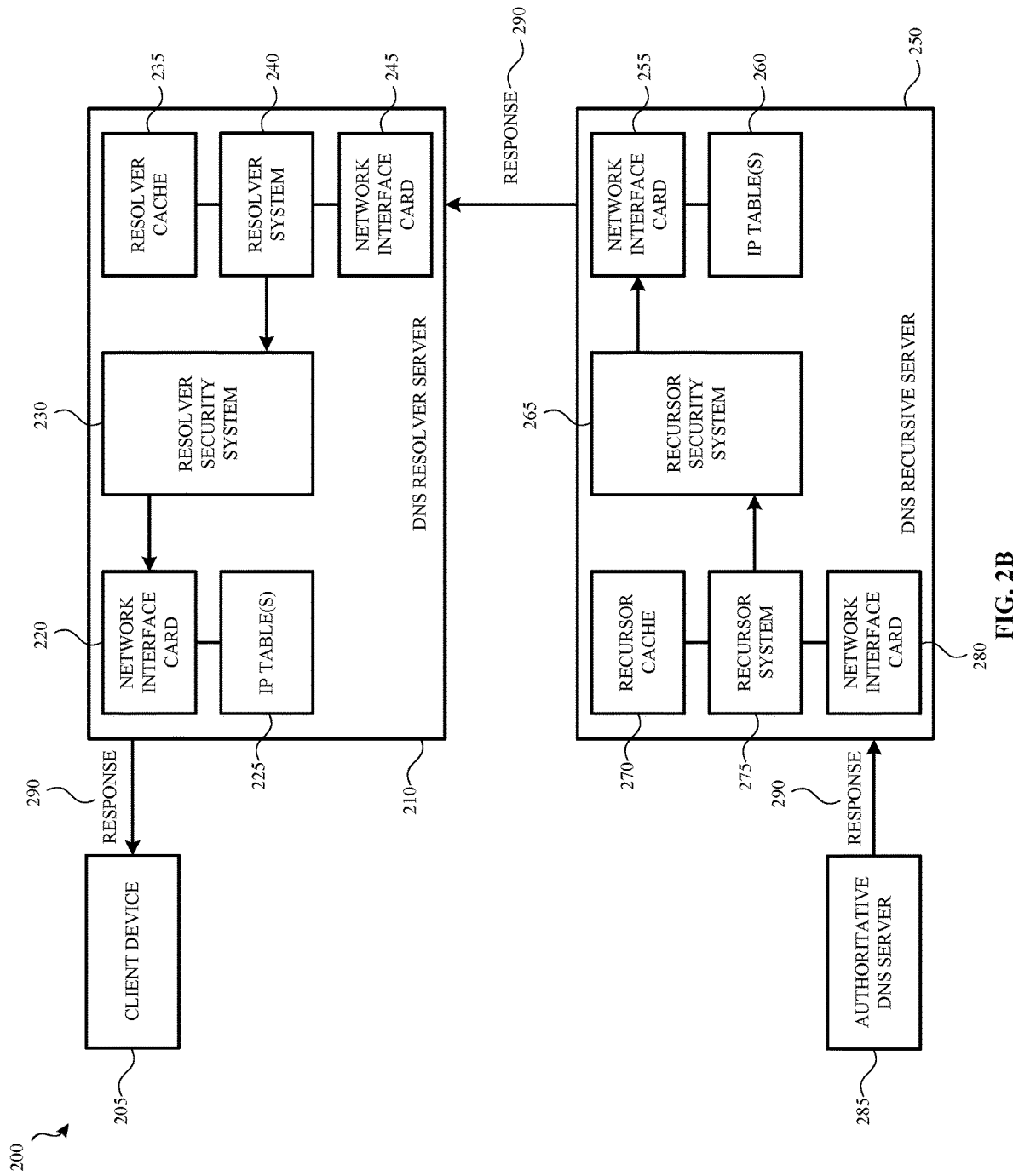
FIG. 2B illustrates the example system of FIG. 2A in which a response to a DNS query is provided to a client device according to an example.
Figure 3:
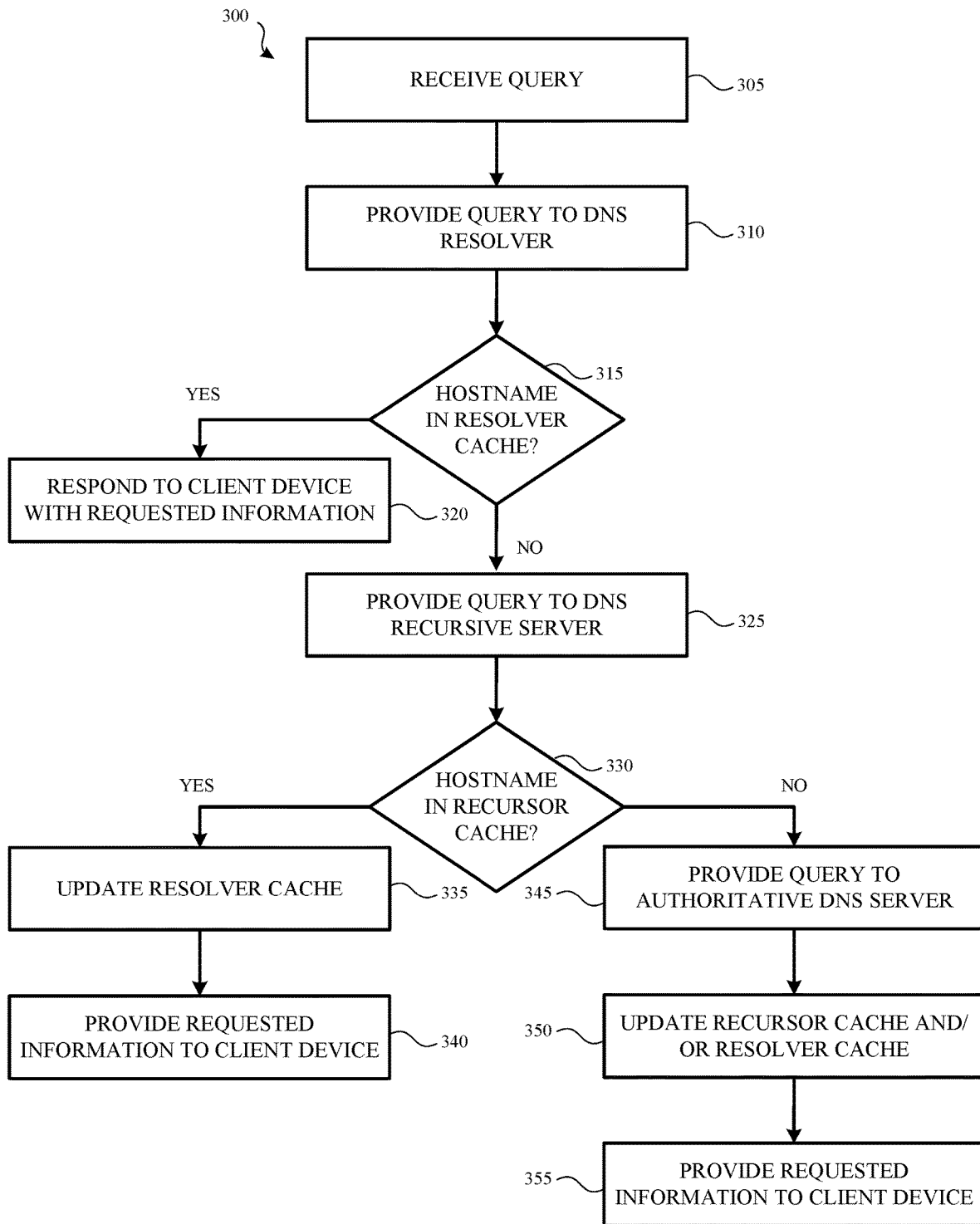
FIG. 3 illustrates a method for providing a response to a received DNS query according to an example.

These and other examples will be shown in more detail and described with respect to FIG. 1-FIG. 3.

FIG. 1 illustrates an example DNS resolving system 100 having a distributed response cache according to an example. The DNS resolving system 100 shown and described improves response times for client queries.

The DNS resolving system 100 may include a network access device 120, a number of different DNS resolvers (e.g., DNS Resolver A 125, DNS Resolver B 130, DNS Resolver C 135, and DNS Resolver D 140), a DNS recursive server 145 and an authoritative server 150.

A client device 105 may access the DNS resolving system 100 via a network 115. For example, the client device 105 may seek to access a particular webpage. In such an example, the client device 105 transmits a query 110 to the DNS resolving system 100 via the network 115. The query 110 includes a request that the DNS resolving system 100 resolve a hostname associated with the query 110.

Upon receiving the query 110, the network access device 120 may analyze information in the query 110 and route the query 110 to a particular DNS resolver. In an example, the DNS resolving system 100 supports an Anycast configuration scheme in which a single destination address has multiple routing paths to two or more endpoint destinations. For example, when the query 110 is received, the network access device 120 may route the query 110 to DNS Resolver A 125, DNS Resolver B 130, DNS Resolver C 135 or DNS Resolver D 140. Although four different DNS resolvers are shown, the DNS resolving system 100 may have any number of DNS resolvers.

Each of the DNS resolvers may include a resolver cache. Thus, when a query 110 is received, the DNS resolver that received the query 110 analyzes its resolver cache to determine whether it can respond to the query 110. For example, the network access device 120 may route the query 110 to DNS Resolver B 130. Upon receiving the query 110, DNS Resolver B 130 may analyze its resolver cache to determine whether it can resolve the hostname associated with the query 110.

If DNS Resolver B 130 can resolve the hostname associated with the query 110, DNS Resolver B 130 may provide a response 155 (e.g., a resolved IP address associated with the hostname), via the network 115, to the client device 105. However, if DNS Resolver B 130 cannot resolve the hostname associated with the query 110, DNS Resolver B 130 forwards the query 110 (or generates a new query) to the DNS recursive server 145.

As shown in FIG. 1, the DNS recursive server 145 is communicatively positioned between the various DNS resolvers of the DNS resolving system 100 and an authoritative DNS server 150. In an example, the DNS recursive server 145 has or is otherwise associated with a recursor cache. The recursor cache may be larger in size when compared with a size of the resolver caches of each of the DNS resolvers. Additionally, a time-to-live (TTL) of the entries in the recursor cache may be longer than a TTL of the entries in the resolver caches. For example, a TTL of an entry (e.g., an IP address associated with a domain name) in the recursor cache may be five-hundred milliseconds while a TTL of the entry in the cache of the DNS resolver may be one ten milliseconds. Although specific amounts of time are given, these are for example purposes only.

Due to the larger recursor cache, the increased TTL of the entries in the recursor cache in the DNS recursive server 145, and due to the fact that queries from the DNS resolvers are directed to the DNS recursive server 145 and not the authoritative DNS server 150 (as is the case in current solutions), the number of requests that are transmitted to the authoritative DNS server 150 may be reduced. Additionally, the response times of DNS queries increases (e.g., are faster).

For example, instead of DNS Resolver A 125, DNS Resolver B 130, DNS Resolver C 135 or DNS Resolver D 140 all submitting separate requests to the authoritative DNS server 150 when the hostname associated with the query 110 cannot be resolved by one of the DNS resolvers, those queries are forwarded to the DNS recursive server 145 instead. Indeed, in some examples, the DNS resolvers may not have access to the authoritative DNS server 150. Therefore, the DNS resolvers cannot overwhelm the DNS server 150 with a number of different requests. If the number of requests is reduced, query response times of the authoritative DNS server 150 may also be increased (e.g., response times may be quicker). Additionally, it may be less likely that the authoritative DNS server 150 suffer ill effects from a cyber-attack such as, for example a DDOS attack.

Continuing with the example above, when the DNS recursive server 145 receives the query 110 from DNS Resolver B 130, the DNS recursive server 145 will determine whether it can resolve the hostname associated with the query 110 using information stored in its recursor cache. If so, the DNS recursive server 145 will provide a response 155 to DNS Resolver B 130. DNS resolver B 130 may use information included in the response 155 to update its resolver cache. DNS resolver B 130 may also provide the response 155 to the client device 105.

However, if the DNS recursive server 145 cannot resolve the hostname associated with the query 110, the DNS recursive server 145 will forward or otherwise provide the query 110 to the authoritative DNS server 150. The authoritative DNS server 150 may resolve the hostname and provide a response 155 to the DNS recursive server 145. When the response 155 is received, the DNS recursive server 145 will update its recursor cache and provide the response 155 to DNS resolver B 130. DNS resolver B 130 may update its resolver cache with the information included in the response 155 and/or provide the response 155 to the requesting client device 105.

In an example, the DNS recursive server 145 may store all received queries in its cache. As queries are received from the various DNS resolvers, the DNS recursive server 145 may filter legitimate queries from those that are determined to be non-legitimate (e.g., queries associated with DDOS attacks). As a result, the DNS recursive server 145 may information the DNS resolvers which queries are legitimate and which queries are not legitimate. This may also protect the system 100 from cache poisoning in which corrupt DNS data is provided to an stored in the cache of a DNS resolver.

FIG. 2A illustrates another DNS resolving system 200 having a distributed response cache according to an example. The DNS resolving system 200 includes a DNS resolver server 210 and a DNS recursive server 250. The DNS resolver server 210 may be equivalent to any one of the DNS resolver servers shown in FIG. 1 (e.g., DNS Resolver A 125, DNS Resolver B 130, DNS Resolver C 135, and DNS Resolver D 140). Likewise, the DNS recursive server 250 may be equivalent to DNS recursive server 145 shown in FIG. 1. Thus, although the DNS resolving system 200 shown in FIG. 2A includes a single DNS resolver server 210, the DNS resolving system 200 may have any number of DNS resolver servers. Likewise, the DNS resolving system 200 may include any number of DNS recursive servers 250—each of which service a respective number of DNS resolver servers 210.

As shown in FIG. 2A, a client device 205 may provide a query 215, via a network (e.g., network 115 (FIG. 1)) to a resolver server 210. The resolver server 210 may include a network interface card 220 or other network access device. For example, the network interface card 220 may be a port that communicatively couples the DNS resolver server 210 to the network and/or to other devices (e.g., the client device 205 as well as other client devices). Traffic received by the DNS resolver server 210 from the client device 205, or traffic exiting from the DNS resolver server 210 to the client device 205, may pass through the network interface card 220.

When the query 215 is received, the network interface card 220 may provide the query 215 to, or otherwise consult, one or more IP tables 225 in order to manipulate or otherwise direct a destination of the query 215 within the DNS resolver server based on a set of pre-defined rules. The network interface card 220 may also provide the query 215 to a resolver security system 230. The resolver security system 230 provides protection from various cyber-attacks by utilizing a container hypervisor that is isolated from other processes executed by the DNS resolver server 210. The resolver security system 230 is explained in U.S. Provisional Patent Application No. 63/208,269, entitled "Lightweight Tuned DDOS Protection", the entire disclosure of which is hereby incorporated by reference in its entirety.

The resolver security system 230 may then provide the query 215 to the resolver system 240. The resolver system 240 determines whether a hostname associated with the query 215 can be resolved using information stored in its resolver cache 235. If the resolver cache 235 includes the requisite information, the DNS resolver server 210 may provide a response (e.g., response 290 (FIG. 2B)) to the client device 205.

However, if the resolver system 240 cannot resolve the query 215, the resolver system 240 forwards the query 225 (or generates a new query), via network interface card 245 and network interface card 255, to the DNS recursive server 250. In an example, the DNS resolver server 210 accesses the DNS recursive server via a private local area network (LAN). In an example, the LAN may be a virtual LAN (VLAN). Thus, a number of different DNS resolver servers may be communicatively coupled to the DNS recursive server 250 even if the DNS resolver servers are located on different LAN segments or are physically located in different geographic areas. Additionally, access to the DNS recursive server 250 may be limited to specific DNS resolver servers 250 which may further limit an exposure of a downstream authoritative DNS server 285.

When the query 215 is received by the network interface card 255 of the DNS recursive server 250 the network interface card 255 may access one or more IP tables 260 and/or provide the query 215 to a recursor security system 265 in a similar manner as was described above with respect to IP tables 225 and the resolver security system 230.

The recursor system 275 analyzes the query 215 using cached information stored in its recursor cache 270. For example, the recursor system 275 determines whether a hostname associated with the query 215 can be resolved with information stored in its recursor cache 270. If the hostname associated with the query 215 can be resolved with information stored in the recursor cache 270, the recursor system 275 generates a response (e.g., response 290 (FIG. 2B)) and provides the response to the DNS resolver server 210.

When the DNS resolver server 210 receives the response 290, the DNS resolver system 240 may update its resolver cache 235 with the information included in the response 290. Additionally, the DNS resolver system 240 may cause the response 290 to be communicated to the client device 205.

However, if the hostname associated with the query 215 cannot be resolved with information stored in the recursor cache 270, the recursor system 275 forwards, generates or otherwise provides the query 215 to an authoritative DNS server 285. In an example, the query 215 is provided to the authoritative DNS server 285 via a network interface card 280.

Referring to FIG. 2B, when the authoritative DNS server 285 receives the query 215, the authoritative DNS server 285 may generate a response 290 that includes the IP address associated with the hostname. The response 290 is provided to the DNS recursive server 250 via the network interface card 280. The recursor system 275 may store information associated with the response 290 in its recursor cache 270. The recursor system 275 may then provide the response 290 to the DNS resolver server 210 (e.g., via the recursor security system 265 and/or the network interface card 255).

The DNS resolver server 210 receives the response 290 (e.g., via the network interface card 245) and the resolver system 240 may update its resolver cache 235 with the information included in the response 290. The resolver system 240 may then provide the response 290 to the client device 205 (e.g., via the resolver security system 230 and/or the network interface card 220).

In an example, the DNS recursive server 250 may prefetch information from the authoritative DNS server 285 based on a determined need. For example, if a popularity of a particular query has increased over a determined amount of time, the DNS recursive server 250 may prefetch information associated with the query from the authoritative DNS server 285 and store that information in its recursor cache 270. Likewise, if a time-to-live of various entries in the recursor cache 270 is about to expire or is below a predetermined and/or specified time-to-live (e.g., a time-to-live specified by an administrator of the DNS recursive server 250), the recursor system 275 may cause that information to be prefetched from the authoritative DNS server 285.

Likewise, the DNS resolver server 210 may prefetch information from the DNS recursive server 250 based on a time-to-live associated with entries in its resolver cache 235. In an example, a prefetch request provided by the DNS resolver server 210 may cause the DNS recursive server 250 to initiate the prefetch process described above.

FIG. 3 illustrates a method 300 for providing a response to a received DNS query according to an example. The method 300 may be performed by various systems of a DNS resolving system such as, for example, DNS resolving system 100 shown and described with respect to FIG. 1.

Method 300 begins when the DNS resolving system receives (305) a query. The query may be received by the DNS resolving system from a client device via a network. The query may include a request for the resolution of a hostname. When the query is received, the query is provided (310) to a DNS resolver.

Upon receiving the query, the DNS resolver determines (315) whether the hostname is stored in its resolver cache. If the hostname is stored in its resolver cache, the DNS resolver responds (320) to the client device with the requested information (e.g., an IP address associated with the hostname). However, if the hostname is not stored in the resolver cache, the query is provided (325) to a DNS recursive server. In an example, the query is provided to the DNS recursive server over a VLAN or other network connection.

Upon receiving the query, the DNS recursive server determines (330) whether the hostname is stored in its associated recursor cache. If the hostname is stored in its recursor cache, a response, including an IP address associated with the hostname, is generated by the DNS recursive server. The response may then be provided to the DNS resolver. The DNS resolver updates (335) is resolver cache with the information included in the response. The DNS resolver may also provide (340) the response to the requesting client device.

However, if it is determined that the hostname is not stored in the recursor cache, the DNS recursive server provides (345) the query to an authoritative DNS server. The authoritative DNS server will resolve the hostname associated with the received query and provide an IP address associated the hostname to the DNS recursor server. Upon receiving the response, the DNS recursor server will update (350) its recursor cache and/or provide the response to the DNS resolver. The DNS resolver may also update (350) its resolver cache and provide (355) the requested information to the client device.

Figure 4:
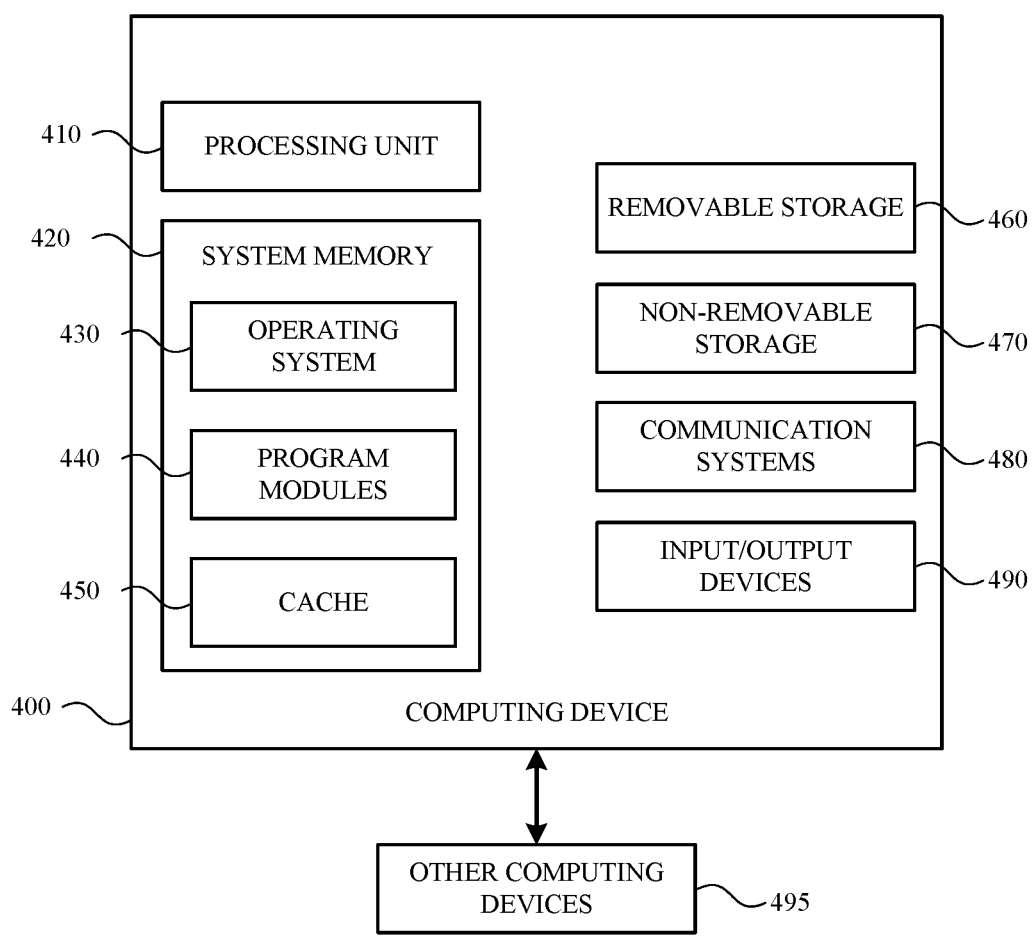
FIG. 4 is a block diagram of a computing device according to one or more examples.

FIG. 4 is a system diagram of a computing device 400 according to an example. The computing device 400, or various components and systems of the computing device 400, may be integrated or associated with a DNS resolver server, a resolver security system, a resolver system, a DNS recursor server, a recursor security system a recursor system and/or an authoritative name server such as described herein. As shown in FIG. 4, the physical components (e.g., hardware) of the computing device are illustrated and these physical components may be used to practice the various aspects of the present disclosure.

The computing device 400 may include at least one processing unit 410 and a system memory 420. The system memory 420 may include, but is not limited to, volatile storage (e.g., random access memory), non-volatile storage (e.g., read-only memory), flash memory, or any combination of such memories. The system memory 420 may also include an operating system 430 that controls the operation of the computing device 400 and one or more program modules 440. The program modules 440 may be responsible for receiving queries and forwarding responses, comparing information in received requests with information stored in a cache 450, determining a time-to-live of the various entries in the cache 450 and so on. A number of different program modules and data files may be stored in the system memory 420. While executing on the processing unit 410, the program modules 440 may perform the various processes described above.

The computing device 400 may also have additional features or functionality. For example, the computing device 400 may include additional data storage devices (e.g., removable and/or non-removable storage devices) such as, for example, magnetic disks, optical disks, or tape. These additional storage devices are labeled as a removable storage 460 and a non-removable storage 470.

Examples of the disclosure may also be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 4 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 400 on the single integrated circuit (chip). The disclosure may also be practiced using other technologies capable of performing logical operations such as, for example, AND, OR, and NOT, including but not limited to mechanical, optical, fluidic, and quantum technologies.

The computing device 400 may include one or more communication systems 480 that enable the computing device 400 to communicate with other computing devices 495 such as, for example, routing engines, gateways, signings systems and the like. Examples of communication systems 480 include, but are not limited to, wireless communications, wired communications, cellular communications, radio frequency (RF) transmitter, receiver, and/or transceiver circuitry, a Controller Area Network (CAN) bus, a universal serial bus (USB), parallel, serial ports, etc.

The computing device 400 may also have one or more input devices and/or one or more output devices shown as input/output devices 490. These input/output devices 490 may include a keyboard, a sound or voice input device, haptic devices, a touch, force and/or swipe input device, a display, speakers, etc. The aforementioned devices are examples and others may be used.

The term computer-readable media as used herein may include computer storage media. Computer storage media may include volatile and nonvolatile, removable and non-removable media implemented in any method or technology for storage of information, such as computer readable instructions, data structures, or program modules.

The system memory 420, the removable storage 460, and the non-removable storage 470 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method, comprising:
   receiving a Domain Name Service (DNS) query from a client device;
   providing the DNS query to a DNS resolver;
   causing the DNS resolver to determine that the hostname associated with the DNS query is not stored in a resolver cache of the DNS resolver;
   providing the DNS query to a DNS recursive server; and
   causing the DNS resolver to determine whether the hostname associated with the DNS query is stored in a recursor cache of the DNS recursive server.

2. The method of claim 1, further comprising causing the resolver cache of the DNS resolver to be updated with the hostname associated with the DNS query.

3. The method of claim 1, further comprising causing the DNS resolver to provide a response to the client device, the response including the hostname associated with the DNS query.

4. The method of claim 1, further comprising causing the DNS recursive server to provide the DNS query to an authoritative DNS server based on a determination that the hostname associated with the DNS query is not stored in the recursor cache of the DNS recursive server.

5. The method of claim 4, further comprising causing the recursor cache of the DNS recursive server to be updated based, at least in part, on a response to the DNS query provided by the authoritative DNS server.

6. The method of claim 5, further comprising causing the resolver cache of the DNS resolver to be updated based, at least in part, on the response to the DNS query provided by the authoritative DNS server.

7. The method of claim 1, wherein the recursor cache is larger than the resolver cache.

8. The method of claim 1, wherein a time-to-live of entries in the recursor cache is longer than a time-to-live of entries in the resolver cache.

9. A system, comprising:
a Domain Name Service (DNS) resolver having a resolver cache; and
a DNS recursive server having a recursor cache, the DNS recursive server operable to:
receive a DNS query from the DNS resolver based on the DNS resolver determining that a hostname associated with a received DNS query is not stored in the resolver cache;
determine that the hostname associated with the DNS query is stored in a recursor cache of the DNS recursive server; and
provide the hostname associated with the DNS query to the DNS resolver.

10. The system of claim 9, wherein the DNS recursive server is further operable to provide the DNS query to an authoritative DNS server based on determining that the hostname associated with the DNS query is not stored in the recursor cache of the DNS recursive server.

11. The system of claim 10, wherein the DNS recursive server is further operable to store the hostname associated with the DNS query in the recursor cache when the hostname associated with the DNS query is received from the authoritative DNS server.

12. The system of claim 9, wherein the recursor cache is larger than the resolver cache.

13. A system, comprising:
a processor; and
a memory coupled to the at least one processor and storing instructions that, when executed by the processor, perform operations, comprising:
receiving a Domain Name Service (DNS) query from a client device;
providing the DNS query to a DNS resolver;
causing the DNS resolver to determine that a hostname associated with the DNS query is not stored in a resolver cache of the DNS resolver;
providing the DNS query to a DNS recursive server; and
causing the DNS resolver to determine whether the hostname associated with the DNS query is stored in a recursor cache of the DNS recursive server.

14. The system of claim 13, further comprising instructions for causing the resolver cache of the DNS resolver to be updated with the hostname associated with the DNS query.

15. The system of claim 13, further comprising instructions for causing the DNS resolver to provide a response to the client device, the response including the hostname associated with the DNS query.

16. The system of claim 13, further comprising instructions for causing the DNS recursive server to provide the DNS query to an authoritative DNS server based on a determination that the hostname associated with the DNS query is not stored in the recursor cache of the DNS recursive server.

17. The system of claim 16, further comprising instructions for causing the recursor cache of the DNS recursive server to be updated based, at least in part, on a response to the DNS query provided by the authoritative DNS server.

18. The system of claim 17, further comprising instructions for causing the resolver cache of the DNS resolver to be updated based, at least in part, on the response to the DNS query provided by the authoritative DNS server.

19. The system of claim 13, wherein the recursor cache is larger than the resolver cache.

20. The system of claim 13, wherein the DNS resolver and another DNS resolver are communicatively coupled to the DNS recursive server but not to an authoritative DNS server.

* * * * *